US009272242B2

(12) United States Patent
Kortunov et al.

(10) Patent No.: US 9,272,242 B2
(45) Date of Patent: Mar. 1, 2016

(54) HIGH CYCLIC CAPACITY AMINES FOR HIGH EFFICIENCY $CO_2$ SCRUBBING PROCESSES

(71) Applicants: Pavel Kortunov, Flemington, NJ (US); Michael Siskin, Westfield, NJ (US); Hans Thomann, Bedminster, NJ (US)

(72) Inventors: Pavel Kortunov, Flemington, NJ (US); Michael Siskin, Westfield, NJ (US); Hans Thomann, Bedminster, NJ (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 381 days.

(21) Appl. No.: 13/933,614

(22) Filed: Jul. 2, 2013

(65) Prior Publication Data
US 2014/0030177 A1   Jan. 30, 2014

Related U.S. Application Data

(60) Provisional application No. 61/677,121, filed on Jul. 30, 2012.

(51) Int. Cl.
*B01D 53/14* (2006.01)
*B01D 53/62* (2006.01)
*C10L 3/10* (2006.01)

(52) U.S. Cl.
CPC .......... *B01D 53/62* (2013.01); *B01D 53/1475* (2013.01); *B01D 53/1493* (2013.01); *C10L 3/104* (2013.01); *B01D 2252/20405* (2013.01); *B01D 2252/20426* (2013.01);
(Continued)

(58) Field of Classification Search
None
See application file for complete search history.

(56) References Cited

U.S. PATENT DOCUMENTS 4,112,052 A * 9/1978 Sartori et al. ...... B01D 53/1475
                                                              423/228
4,217,238 A   8/1980 Sartori et al.
(Continued)

FOREIGN PATENT DOCUMENTS

CN   101327392 A   12/2008
EP   0705637 A1   10/1996

OTHER PUBLICATIONS

Hook, An Investigation of Some Sterically Hindered Amines as Potential Carbon Dioxide Scrubbing Compounds, Ind. Eng. Chem. Res. 1997, 36, 1779-1790.
(Continued)

*Primary Examiner* — Jonathan Johnson
*Assistant Examiner* — Anita Nassiri Motlagh
(74) *Attorney, Agent, or Firm* — Malcolm D. Keen; David M. Weisberg; Andrew T. Ward

(57) ABSTRACT

A high cyclic capacity carbon dioxide scrubbing process contacts a gas stream containing carbon dioxide in a sorption zone with a liquid scrubbing solution of a low molecular weight sterically hindered amine, particularly a secondary alkanolamine or aminoether at a high concentration, typically at least 3.5M and at a temperature of at least 30° C. to sorb the carbon dioxide into the solution and form a rich stream of the sorbed carbon dioxide in the solution in the form of dissolved amine carbamate and/or alkanolamine bicarbonate. The rich stream is then passed from the sorption zone to at least one regeneration zone and the sorbed carbon dioxide is desorbed as gas from the solution to form a lean solution containing a reduced concentration of sorbed carbon dioxide relative to the rich stream; the lean stream is then returned to the sorption zone for a further sorption cycle.

28 Claims, 10 Drawing Sheets

(52) U.S. Cl.
CPC ............... *B01D 2252/20484* (2013.01); *B01D 2258/0283* (2013.01); *Y02C 10/06* (2013.01)

(56) References Cited

U.S. PATENT DOCUMENTS

| | | | |
|---|---|---|---|
| 4,405,581 A | 9/1983 | Savage et al. | |
| 4,405,583 A | 9/1983 | Stogryn et al. | |
| 4,405,585 A | 9/1983 | Sartori et al. | |
| 4,471,138 A | 9/1984 | Stogryn | |
| 4,892,674 A | 1/1990 | Ho et al. | |
| 4,894,178 A | 1/1990 | Ho et al. | |
| 8,034,166 B2 | 10/2011 | Asprion et al. | |
| 2006/0266214 A1* | 11/2006 | Won | B01D 53/1462 95/234 |
| 2008/0159937 A1* | 7/2008 | Ouimet | B01D 53/1475 423/230 |
| 2010/0037775 A1 | 2/2010 | Siskin et al. | |
| 2011/0171093 A1* | 7/2011 | Rochelle | B01D 53/1456 423/228 |
| 2012/0060686 A1 | 3/2012 | Kortunov et al. | |

OTHER PUBLICATIONS

Lepaumier et al; New Amines for CO2 Capture. I. Mechanisms of Amine Degradation in the Presense of CO2, Ind. Eng. Chem. Res. 2009, 48, pp. 9061-9067.

Lepaumier et al.; New Amines for CO2 Capture. II. Oxidative Degradation Mechanisms, Ind. Eng. Chem. Res. 2009, 48, 9068-9075.

Lepaumier et al.; New Amines for CO2 Capture. III. Effect of Alkyl Chain Length between Amine Functions on Polyamines Degradation, Ind. Eng. Chem. Res. 2010, 49, 4553-4560.

Meldon; "Amine Screening for flue gas CO2 capture at coal-fired power plants: Should the heat of desorption be high, low or in between?" Current Opinion in Chemical Engineering 2011, 1:55-63.

Mitchell; "Mitsubishi's carbon capture technology", Separation and Capture- Carbon Capture Journal, Jan.-Feb. 2008, 24-26.

Freeman et al., Thermal Degradation of Aqueous Piperazine for CO2 Capture. 1. Effect of Process Conditions and Comparison of Thermal Stability of CO2 Capture Amines, Ind. Eng. Chem. Res. 2012, 51, pp. 7719-7725.

Sartori et al., "Sterically Hindered Amines for CO2 Removal from Gases", Ind. Eng. Chem. Fundam. 1983, 22, pp. 239-249.

Chowdhury, F. et al., "Synthesis and selection of hindered new amine adsorbents for CO2 capture", Energy Procedia, Apr. 1, 2011, pp. 201-208, vo. 4, Science Direct, Elsevier, Ltd.

International Search Report and Written Opinion for PCT/US2013/049083 dated Sep. 30, 2013.

* cited by examiner

HIGH CYCLIC CAPACITY AMINES FOR HIGH EFFICIENCY $CO_2$ SCRUBBING PROCESSES

CROSS-REFERENCE TO RELATED APPLICATIONS

This application claims the benefit of provisional U.S. Patent Application No. 61/677,121, filed Jul. 30, 2012, the entire contents of which are hereby incorporated by reference.

FIELD OF THE INVENTION

This invention relates to the removal of carbon dioxide and other acid gases from a gaseous stream containing one or more of these gases. In particular, the invention relates to a method for separating an acid gas, e.g., carbon dioxide, from a gas mixture using one or more secondary amines as the sorbent.

BACKGROUND OF THE INVENTION

The removal of carbon dioxide from mixed gas streams is of great industrial importance and commercial value. Carbon dioxide is a ubiquitous and inescapable by-product of the combustion of hydrocarbons and there is growing concern over its accumulation in the atmosphere and its potential role in global climate change. Laws and regulations driven by environmental factors may therefore soon be expected to require its capture and sequestration. While existing methods of $CO_2$ capture have been satisfactory for the scale in which they have so far been used, future uses on the far larger scale required for significant reductions in atmospheric $CO_2$ emissions from major stationary combustion sources, such as power stations fired by fossil fuels, makes it necessary to improve the energy efficiency of the processes used for the removal of $CO_2$ from gas mixtures and thereby lower the cost of $CO_2$ capture. According to data developed by the Intergovernmental Panel on Climate Change, power generation produces approximately 78% of stationary source emissions of $CO_2$ with other industries such as cement production (7%), refineries (6%), iron and steel manufacture (5%), petrochemicals (3%), oil and gas processing (0.4%) and the biomass industry (bioethanol and bioenergy) (1%) making up the bulk of the total, illustrating the very large differences in scale between power generation on the one hand and all other uses on the other. To this must be added the individual problem of the sheer volumes of gas which will need to be treated. Flue gases generally consist mainly of nitrogen from combustion air, with the $CO_2$, nitrogen oxides, and other emissions such as sulfur oxides making up relatively smaller proportions of the gases which require treatment. Typically, the wet flue gases from fossil fuel power stations typically contain about 7-15 vol % of $CO_2$, depending on the fuel, with natural gas giving the lowest amounts and hard coals the highest.

Cyclic $CO_2$ sorption technologies such as Pressure Swing Absorption (PSA) and Temperature Swing Absorption (TSA) using liquid sorbents are well established. The sorbents mostly used include liquid solvents, as in amine scrubbing processes, although solid sorbents are also used in PSA and TSA processes. Liquid amine sorbents dissolved in water are probably the most common sorbents. Amine scrubbing is based on the chemical reaction of $CO_2$ with amines to generate carbonate/bicarbonate and carbamate salts: the aqueous amine solutions chemically trap the $CO_2$ by the formation of one or more of these ammonium salts (carbamateicarbonate/bicarbonate). The reaction tends to be reversible, and these salts can be converted back to the original components upon suitable adjustment of conditions, usually temperature, enabling the regeneration of the free amine at moderately elevated temperatures. Commercially, amine scrubbing typically involves contacting the $CO_2$ and/or $H_2S$ containing gas stream with an aqueous solution of one or more simple alkanolamines which are selected preferentially, as the hydroxyl group confers greater solubility in water for both the amine(s) and for the reaction product(s). Alkanolamines, such as monoethanolamine (MEA), diethanolamine (DEA), and triethanolamine (TEA), as well as a limited set of hindered amines, are currently used in commercial processes. The cyclic sorption process requires high rates of gas-liquid heat exchange, the transfer of large liquid inventories between the sorption and regeneration zones, and high energy requirements for the regeneration of amine solutions. With the exception of the amine processes based on hindered amines, the amine scrubbing process is challenged by the corrosive nature of the amine solutions containing the sorbed $CO_2$, which forms the amine-$CO_2$ reaction products. Without further improvement, these difficulties would limit the economic viability of the aqueous amine scrubbing processes in very large scale applications.

The cyclic sorption processes using aqueous sorbents typically require a significant temperature differential in the gas stream between the sorption and desorption (regeneration) parts of the cycle. In conventional aqueous amine scrubbing methods, relatively low temperatures, e.g., less than 50° C., are required for $CO_2$ uptake, with an increase to a temperature above about 100° C. (e.g., 120° C.) required for the desorption. The heat required to maintain the thermal differential is a major factor in the cost of the process. With the need to regenerate the solution at temperatures above 100° C., the high latent heat of vaporization of the water (~2260 kJ/Kg at ~100° C.) obviously makes a significant contribution to the total energy consumption. If $CO_2$ capture is to be conducted on the larger scale appropriate to use in power plants, more effective and economical separation techniques need to be developed.

Another area where more efficient $CO_2$ separation processes are needed is in enhanced oil recovery (EOR), where $CO_2$ is re-injected into the gas or liquid hydrocarbon deposits to maintain reservoir pressure. With the advanced age of many producing reservoirs worldwide and the ever-increasing challenge of meeting demand, the expanding use of EOR methods is becoming more widespread. Typically, the source of carbon dioxide for EOR is the producing hydrocarbon stream itself, which may contain anywhere from less than 5% to more than 80% of $CO_2$. Other options are capture of $CO_2$ from the flue gases of various combustion sources and pre-combustion capture of $CO_2$ from shifted syngas produced in fuel gasification processes.

The use of sterically hindered amines for $CO_2$ capture was proposed by Sartori and Savage in "Sterically Hindered Amines for $CO_2$ Removal from Gases," *Ind. Eng. Chem. Fundamen.*, 1983, 22(2), 239-249, pointing out that sterically hindered amines have unique capacity and rate advantages in $CO_2$ sorption processes: their rich solutions can be desorbed to a greater extent than their non-substituted counterparts, thus producing a leaner solution (lower total carbamate/bicarbonate/carbonate concentration), which tends to result in a greater mass transfer upon reabsorption. A limited number of processes using sterically hindered amines as alternatives to MEA, DEA, and TEA are used commercially for $CO_2$ capture; examples include the KS-1™ Process from Mitsubishi Heavy Industries and Kansai Electric Power Co and the ExxonMobil Flexsorb® Process, which uses sterically hindered amine(s) for selective $H_2S$ separation. Processes using solid sorbents are also known: they may avoid some of the limitations of amine scrubbing, such as large capital investment and high regeneration energy intensity, but they suffer from a lack of sorbents having sufficiently selective $CO_2$ sorption under the humid conditions present in combustion flue gas and from the difficulty in designing gas/solid contactors to process large volumes of gas at high throughput rates.

In the design of a practical $CO_2$ capture process, a number of issues should be considered, including the efficiency of the capture process in terms of the cyclic capacity of the process, the efficiency of the capture process in terms of the energy required for desorption of the $CO_2$ and regeneration of the amine sorbent, the requirement for steady replenishment of fresh amine to maintain the desired sorption capacity, as well as corrosion factors. These issues are, of course, directly affected by the chemistry of the sorption process and the efficiency of the chemisorption processes. As such, conventional aqueous amine scrubbing processes are dependent in part on the ability of the sorbent medium to react with the $CO_2$ and on the rate of that reaction. Another important factor is the optimum combination of conditions for sorption and desorption of $CO_2$. This is one of the key parameters that defines the cyclic capacity (which is also known as the swing capacity or working capacity of the amine scrubbing process). The molar ratio of the $CO_2$ capture per mole of amine is one factor that can determine the cyclic capacity. Another factor is the practical concentration of the amine in the solution. More $CO_2$ per unit of amine can be captured as the concentration of the amine increases, and, in turn, a more concentrated solution of amine per unit volume of solution confers several benefits. First, less liquid amine solution needs to be circulated between the sorber and stripper zones as the carrying capacity increases with increasing amine concentration. Second, a more concentrated amine solution requires less energy to regenerate the amine and release the $CO_2$ in the stripper zone, since less water enters the stripper.

In conventional aqueous amine systems, the process by which $CO_2$ is sorbed by tertiary amines is believed to proceed by dissolution of the gaseous $CO_2$ in water to form carbonic acid ($H_2CO_3$), which is neutralized by the amine to form an ammonium bicarbonate. At high pH, the ammonium bicarbonate may then react with a second mole of amine to form an ammonium carbonate. Primary and secondary amines may also react directly with the $CO_2$ to form an ammonium carbamate, which is itself stable in the presence of water and may be present as a significant reaction product, especially at high amine concentration; tertiary amines, lacking a free proton, are incapable of forming the carbamate, which is believed to be formed by primary and secondary amines by the initial formation of an unstable zwitterion intermediate, which rapidly decomposes via internal proton transfer to the carbamic acid. Both the zwitterion and the carbamic acid are unstable, and it is not known which equilibrium form undergoes further reaction, although it is posited that it is the carbamic acid, which may be deprotonated by a second equivalent of free amine to produce the ammonium carbamate salt with the overall stoichiometric requirement of two moles of amine per one mole of carbon dioxide sorbed (0.5:1 $CO_2$:amine).

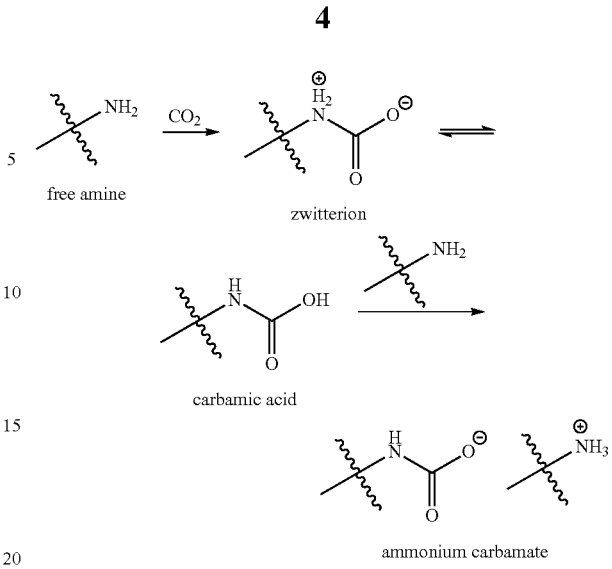

Further reaction of the carbamate with water may lead to a final bicarbonate product with a ~1:1 $CO_2$:amine ratio, or to a carbonate product with a ~0.5:1 $CO_2$:amine ratio depending on solution pH. Thus, the conventional aqueous amine processes, which use primary amines, can have a limited sorption efficiency, which has a maximum $CO_2$:amine molar of ratio of 1:1 achieved with the formation of the bicarbonate as the final reaction product.

While the use of hindered amines for $CO_2$ removal might therefore present itself as an attractive approach, operational problems and difficulties have been encountered. For example, although the sterically hindered primary amine 2-amino-2-methyl-1-propanol (AMP, whose use for $CO_2$ sorption is reported by Sartori et al., op. cit.), forms a bicarbonate from which the free amine is readily thermally released, it has been found that its practical utility is limited by the formation of insoluble precipitates at amine concentrations above about 3M in aqueous solution. For this reason, the solution has to be relatively dilute so that the physical size of the unit for a given treatment capacity has to be rather large to handle the higher volume of liquid solvent, resulting in a larger capital investment, a lower operating efficiency, and a higher cost for the $CO_2$ capture.

SUMMARY OF THE INVENTION

We have identified a class of secondary amines, which can be used for $CO_2$ scrubbing at higher relative concentrations while forming amine/$CO_2$ reaction products of higher or at least acceptable solubility, while reducing the incidence of precipitate formation until very high solution loadings are attained. These amines can also exhibit high reaction rates and, as a measure of the relatively lower thermal stability of the carbamate and bicarbonate reaction products, can permit regeneration under milder conditions, for example at lower temperatures and/or pressures, by gas stripping, by flash vaporization, or a combination of these adjustments. The amines disclosed in conjunction with the present invention can be used in a variety of applications requiring the removal of $CO_2$ from a gas stream, including but not limited to, gas streams produced by the combustion of fossil fuels, syngas streams, natural gas streams, gas streams produced from subsurface geologic formations, and the like, as well as combinations thereof.

According to the present invention, a high cyclic capacity carbon dioxide scrubbing process can comprise contacting a gas stream containing carbon dioxide in a sorption zone with a liquid scrubbing solution of a sterically hindered secondary amine, preferably an alkanolamine and/or aminoether at a total amine concentration of at least 3.0M and at a temperature of at least 10° C., to sorb the carbon dioxide into the solution and to form a rich stream of the sorbed carbon dioxide in the solution in the form of dissolved amine carbamate and/or amine bicarbonate. The rich stream (amine solution, reacted with $CO_2$) can then be passed from the sorption zone to at least one regeneration zone, and the sorbed carbon dioxide can be desorbed from the solution to form a lean solution stream(s) containing a reduced concentration of sorbed $CO_2$ relative to the rich stream; the lean stream(s) can then be returned to the sorption zone for a further sorption cycle. The high cyclic capacity of the present process, namely, the difference between the $CO_2$ loadings in the rich stream and the regenerated lean stream(s) which can be achieved by suitable choice of conditions in the process, can advantageously result in lower plant investment/operating costs.

As used herein, the term "flue gas" should be understood to refer to a composition of gases produced from the combustion of any type of fossil fuel, such as natural gas, oil, and/or coal. The composition of a flue gas can vary depending on many factors, including but not limited to, the type of fossil fuel used, the type of oxidizing agent used, and the relative concentrations of oxidizing agent and fossil fuel, inter alia. Furthermore, the pressure of the flue gas can vary widely, e.g., from about 1 bar (about 100 kPaa) to about 200 bar (about 20 MPaa) and even higher, depending on the detailed operating parameters of the combustion vessel. These operating conditions can also influence the temperature of the flue gas. A usual practice can include cooling the flue gas using direct contact with cold water and/or indirect methods such as heat exchangers to achieve a desired flue gas temperature upon entering the $CO_2$ absorber vessel. The utilization of the amines disclosed in the present invention can additionally or alternatively be used to separate $CO_2$ during the processing of natural gas, such as extracted from sub-surface hydrocarbon bearing geologic formations. In such cases, the partial pressure of $CO_2$ can vary over an extremely wide range, e.g., from about 0.01 bar (about 1 kPaa) to about 200 bar (about 20 MPaa) or more, which can depend on the total gas pressure, the $CO_2$ concentration, or other parameters, or combinations thereof.

The secondary amines used for removing $CO_2$ from gas streams such as flue gas, syngas, and/or natural gas, for example, can be sterically hindered secondary alkanolamines and/or aminoethers, i.e., having one or no protons on the carbon atom alpha to a secondary amino group. The alpha carbon atom is preferably a secondary carbon, i.e., with one proton. In addition, low molecular weights can be preferred, since the chemisorption process is believed to function on a molecular basis, while sorbents are typically purchased on a weight basis. Thus, the selected alkanolamines can advantageously exhibit molecular weights not more than about 180 amu, although higher mw materials are not necessarily excluded if they possess sufficiently lower cost/efficiency benefit. Molecular weights of 150 amu or less can be preferred.

In general terms, preferred secondary amines for use in the present $CO_2$ separation processes can include alkanolamines and/or aminoethers having a secondary nitrogen atom attached to an alpha carbon with one or no attached protons, i.e. a secondary or tertiary carbon. Exemplary alkanolamines can include the N-alkyl derivatives of 2-amino-1-propanol (AP), especially 2-N-methylamino-1-propanol (MAP), 2-N-methylamino-2-methyl-1-propanol (MAMP), as well as derivatives with two or more hydroxyl groups and/or ether derivatives.

Sorption and regeneration of the alkanolamine sorbent solution can be carried out in a traditional absorber, flash drums, stirred reactor, spray tower, or heat exchanger, as convenient, and in most cases a conventional cyclic liquid sorption/regeneration unit can be useful. The selection of the specific $CO_2$ process configuration, conditions, and operating envelope can be determined by site specific application requirements, such as but not limited to the required $CO_2$ removal rate from the gas stream, the characteristics of the gas stream (composition, temperature, pressure, etc.), and the desired sorbed $CO_2$ purity. The amines used in the present process can additionally or alternately have an advantage of being useful as a retrofit in a conventional absorber/stripper plant designed for conventional amines such as MEA. In such retrofit situations, it might be desirable to add a flash regeneration zone to a retrofit unit, as conventional (e.g., MEA) amine units typically do not contain them.

DETAILED DESCRIPTION OF THE EMBODIMENTS

Gas Stream

Figure 1:
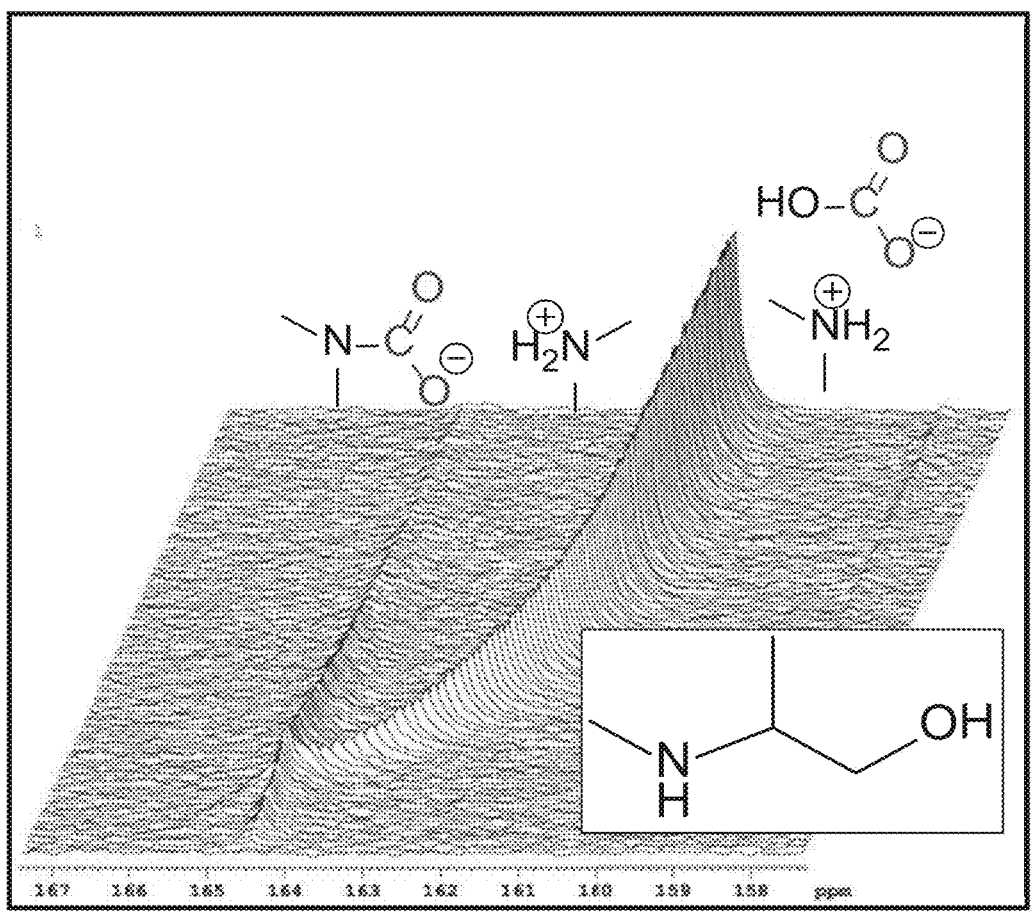
FIGS. 1-3 compare the mechanism of $CO_2$ reaction with the hindered amines MAP and MAMP vs. the unhindered amine MEA.

The gas streams which are particularly amenable to treatment by the present sorption process can include, but are not necessarily limited to, flue gas from the combustion of carbonaceous fuels and natural gas from subterranean sources. Flue gas streams may originate from the combustion of carbon-containing fossil fuels such as natural gas, petrochemical processing, lignite coals, sub-bituminous coals, bituminous coals, and anthracite coals. Their $CO_2$ content may typically vary from about 3-15 vol %, depending on the fuel, with the highest levels coming from hard coal combustion. Natural gas streams containing carbon dioxide may contain, in addition to methane and carbon dioxide, one or more other gases such as ethane, propane, n-butane, isobutane, hydrogen, carbon monoxide, ethene, ethyne, propene, nitrogen, oxygen, helium, carbonyl sulfide, hydrogen sulfide, and the like, as well as, in some cases, mercury contaminants, if they have not been removed by other pre-treatment. Additional or alternative streams which can be treated by the present separation process can include syngas and shifted syngas produced in fuel gasification processes, gas streams produced in the manufacture of hydrogen, for example from methane steam reforming, and gas streams from refinery and petrochemical plants, whose compositions will naturally depend on the process from which they are derived. Water is typically likely to be present both in flue gases and in natural gas from combustion of hydrocarbon fuels or from contact with ground waters. Although the present process can accept water in the entering gas stream, as described below, removal of substantial quantities may be desirable, for example, by treatment with a drying agent or by cooling to condense and thereby reduce the water content so as to avoid an undesirable accumulation of water in the process.

The pressure and/or composition of the gas stream can vary according to its source, the type of combustion vessel used, the operating conditions selected for the combustion vessel, and the like, and combinations thereof; natural gas streams can typically be encountered at higher pressures than flue gas streams (e.g., typical pressures for natural gas processing can be from about 500 psig (about 3.4 MPag) to about 1200 psig (about 8.2 MPag); with the range of $CO_2$ concentrations in natural gas processing typically falling from about 1 vol % to about 80 vol %, the $CO_2$ partial pressures in those streams can thus typically be from about 5 psi (about 34 kPa) to about 960 psi (about 6.5 MPa)), and streams from refinery and petrochemical units can vary according to the processing conditions used in the unit. Flue gas streams typically exhibit roughly atmospheric pressures, which can be as low as 0.90 bar (90 kPaa) but the partial pressure of the carbon dioxide in the flue gas stream can typically be in the range from 0.03 bar (3 kPa) to 0.1 bar (10 kPa) or from 0.03 bar (3 kPa) to 0.15 bar (15 kPa), with relatively large amounts of nitrogen from combustion air typically resulting in relatively low $CO_2$ partial pressures in the stream (e.g. ~1 vol % $CO_2$ in $N_2$ or oxygen-depleted air in the total flue gas at ~1 bara results in a $CO_2$ partial pressure of ~0.01 bar in the flue gas; ~10 vol % $CO_2$ in $N_2$ or oxygen-depleted air in the total flue gas at ~1 bara results in a $CO_2$ partial pressure of ~0.1 bar in the flue gas; etc.). The partial pressure of the $CO_2$ in the sorption zone (tower inlet) can typically be at least 0.025 bar (2.5 kPa) and in most cases at least 0.03 bar (3 kPa).

Process Configuration

The separation process can be carried out, e.g., in a conventional manner where the separation is based on the reaction between the gas mixture and a solution of the amine sorbent. This solution can circulate in a continuous closed cycle circulating between a sorption zone and a regeneration zone, with both zones conventionally in the form of columns or towers. In the sorption zone, the incoming gas stream can normally be passed into a tower countercurrent to a descending stream of liquid sorbent solution at a relatively low temperature, e.g., from about 20° C. to about 80° C. or more commonly from about 40° C. to about 45° C. After reaction with $CO_2$, the amine solution (the rich stream) containing the separated $CO_2$ in the form of the $CO_2$/amine reaction product, can then pass to a regeneration section(s). In the regeneration tower, the sorbent solution can be regenerated by separating the sorbed $CO_2$ by a change in conditions under which desorption is favored, typically by change in temperature (usually an increase), pressure, or a combination thereof. In a preferred embodiment, an intermediate heat exchanger upstream of the regenerator tower may be used to flash off $CO_2$ from the less thermally stable bicarbonate product at lower temperature (but higher than the sorber temperature), thereby reducing the load on the regenerator, e.g., mainly due to the decomposition of carbamate product at a higher temperature. This combination of a rich amine flash vaporization ahead of the stripper tower could advantageously reduce the energy required for regeneration, typically with a corresponding reduction in the cost of the amine plant. Gas stripping may be used to raise the temperature and/or decrease the partial pressure of the $CO_2$ to favor desorption. The regenerated amine solution (the lean stream) may then be recirculated to the sorption tower after cooling if necessary. An additional or alternative configuration option can be to insert a lean flash vaporization after stripping to further decompose the amine-$CO_2$ reaction product into $CO_2$ and regenerated amine, which can advantageously increase system $CO_2$ sorption capacity (via additional free amine being recirculated). Using the combination of rich stream flash, stripping, and lean stream flash can increase the differential between the $CO_2$ loading of the rich amine and the lean amine. Instead of utilizing this advantage as an increase in sorption capacity, it can be alternatively realized as an increase in efficiency of the $CO_2$ capture process by reducing the volume of amine solution that needs to be circulated between the absorber tower and the regeneration tower and/or flash vaporization vessels for absorbing a given amount of $CO_2$. In this alternative scenario, reduced amine circulation volume can reduce the energy required for pumping the amine solution, which can contribute to a lower overall capture energy. Some or all of these benefits (e.g., flash vaporization options) can be enabled by favorable reaction chemistry and the vapor-liquid equilibrium properties of the amines disclosed in the present invention. The desorbed $CO_2$ from the regeneration zone may be compressed and/or liquefied for transport to a sub-surface storage (i.e., sequestration) or for utilization, e.g., for $CO_2$ Enhanced Hydrocarbon (Oil and/or Gas) Recovery or for use as a feedstock in chemical manufacture. A simplified schematic of a cyclic liquid process sorption/desorption unit using a liquid alkanolamine sorbent solution is shown in U.S. Patent Application Publication No. 2012/060686, to which reference is made for the schematic.

Sorption/Regeneration Process

The stability of the $CO_2$/amine species generally decreases with increasing temperature, so that sorption of the $CO_2$ can be favored by lower temperatures, but, with operation with flue gas, the temperature can typically be higher, unless the incoming gas stream is initially cooled. With natural gas streams, the temperature can often be lower, particularly if the gas has been passed through an expansion before entering the scrubbing unit. The sorption temperature can typically be at least about 10° C. (e.g., at least about 15° C., at least about 20° C. at least about 25° C., at least about 30° C., at least about 35° C., at least about 40° C., at least about 45° C., at least about 50° C., at least about 55° C. at least about 60° C. at least about 65° C., at least about 70° C., at least about 75° C., or at least about 80° C.) and/or at most about 90° C. (e.g., at most about 85° C., at most about 80° C., at most about 75° C., at most about 70° C., at most about 65° C. at most about 60° C., at most about 55° C. at most about 50° C., at most about 45° C., or at most about 40° C.). In most embodiments, however, a maximum temperature for the sorption can be about 75° C., and, if operation is feasible at a lower temperature, e.g., with a chilled incoming natural gas or refinery process stream, resort may be advantageously made to lower temperatures at this point in the cycle. A sorption temperature of about 70° C. is a suitable target value for flue gas scrubbing. Temperatures below about 50° C. are likely to be favored for optimal sorption, if capable of attainment at relatively low incremental cost; these lower sorption temperatures are routinely obtainable using a variety of well-known gas stream cooling methods, such as direct contact of the flue gas with a chilled water spray or an air cooler.

The $CO_2$ can be desorbed from the sorbent material by any appropriate steps, such as conventional methods including but not limited to temperature swing, pressure swing, and stripping with an inert (non-reactive) gas stream such as nitrogen, hot $CO_2$, or steam in the regeneration tower. Temperature swing operation is often a choice in conventional cyclic sorption plants. The temperature of the rich solution from the sorption zone can be raised in the regeneration tower, e.g. by passage through a heat exchanger at the tower bottom or with steam or other hot gas. Desorption temperatures can be dependent on the vapor/liquid equilibria for the selected system, e.g. amine and/or $CO_2$ concentration, and can typically be at least 10° C. above, e.g., at least 15° C. above or at least 20° C. above, the temperature in the sorption zone. Typical temperatures in the regeneration zone can be higher than the temperature of the sorption zone and usually above 100° C. (e.g., 120° C.±10° C.), and temperatures above 120° C. may be preferable to generate the $CO_2$ product at higher pressures. However, temperatures at or just below 100° C. (e.g., from about 65° C. to about 100° C.) may be used, if allowance is made for accumulation of water vapor and if carbamate decomposition rate is appropriately high. Thermal desorption, e.g., by passing the rich solution through a hot bath with a head space at controlled pressure (typically about 1.0 bar), can be a preferred option. Pressure control can be effected by removal of the desorbed gas at an appropriate rate. Pressure swing sorption can be less favored in view of the need for recompression; the pressure drop will be determined by the vapor-liquid equilibria at different pressures. The combined use of pressure swing and temperature swing can be favored in some situations where the feed gas stream may be at relatively high pressure, e.g., in certain natural gas processing.

A slip stream of the previously separated $CO_2$ may additionally or alternatively be used for stripping, although the concentration of residual $CO_2$ in the lean sorbent stream returning to the sorption tower may be higher, and compensation to lower the $CO_2$ partial pressure in the tower can be required to facilitate carbamate decomposition. The reduction in the $CO_2$ partial pressure from gas stripping can promote desorption of the gas, and, when this expedient is used, there may be no requirement for a significant pressure reduction, although the pressure may be reduced for optimal stripping, suitably to the levels used in pressure swing operation. Stripping with mixtures of an inert (non-reactive) gas and hot $CO_2$ may be effective. When carrying out the desorption by inert gas sparging and/or pressure swing operation, the temperature may be maintained at a value at or close to that used in the sorption step, although desorption can be favored by an increase in temperature from the sorption zone to the regeneration zone, either with or without stripping or a decrease in pressure. When stripping with previously separated $CO_2$, desorption of the $CO_2$ from the rich solution stream can be favored by heating the $CO_2$ stripping gas.

Amine Sorbents

Due to their high basicity and steric hindrance on and surrounding the amino group, the amines (including the hindered alkanolamines and aminoethers) according to the present invention can allow fine tuning by adjusting conditions (e.g., temperature, pressure, concentration, etc.) of the composition of $CO_2$-amine reaction products. The formation of carbamate and bicarbonate reaction products can be partly or completely controlled by using selected hindered secondary amines. Formation of the bicarbonate with its ~1:1 ratio of $CO_2$:amine can be particularly desirable for achieving a desirably lower regeneration temperature and a relatively high $CO_2$ loading capacity. In this case, $CO_2$ can be captured and transferred to the regenerator(s) in the form of a mixture of bicarbonate and carbamate, according to the following proposed mechanism:

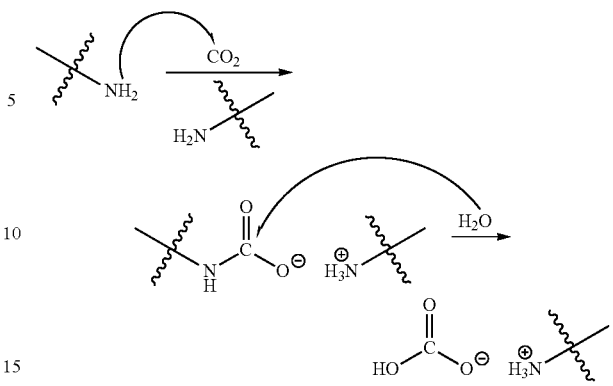

Transfer of the $CO_2$/amine reaction product into a regenerator in the form of the bicarbonate can be more beneficial because of its relatively high $CO_2$ capacity (~1 $CO_2$ per amine), as well as its relatively favorable viscosity and corrosivity characteristics. The bicarbonate can also be less thermally stable than the carbamate, offering the potential for regeneration ($CO_2$ desorption) at lower temperatures, thus substantially reducing process energy requirements and regeneration costs.

The secondary amines used for removing $CO_2$ from gas streams such as flue gas, syngas, natural gas, and the like can be sterically hindered secondary amines, preferably alkanolamines and aminoethers. e.g., which have no more than one proton on the carbon atom alpha to a secondary amino (—NHR) group. In a preferred embodiment, the alpha carbon atom can be a secondary or tertiary carbon, i.e. with no more than one proton. In certain embodiments, low molecular weights can be preferred, since the chemisorption process appears to function on a molecular basis while the sorbents are purchased on a weight basis, and the compounds with the higher molecular weight can typically have a lower number of $CO_2$ binding sites per unit weight of amine solution. Accordingly, the alkanolamines according to the present invention can be preferred at molecular weights of not more than about 180 amu (e.g., not more than about 150 amu, not more than about 120 amu, not more than about 110 amu, or not more than about 100 amu), although higher molecular weight materials are not necessarily excluded in spite of their lower cost/efficiency benefit. In general terms, preferred secondary alkanolamines/aminoethers for use in the present $CO_2$ separation process can be described by the general formula:

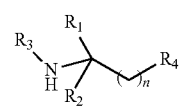

where $R_1$ is hydrogen or a $C_1$-$C_4$ alkyl or hydroxyalkyl group (e.g., —$CH_3$, —$C_2H_5$, —$CH_2OH$, or —$C_2H_4OH$); $R_2$ is a $C_1$-$C_4$ alkyl or hydroxyalkyl group, (e.g., —$CH_3$, —$C_2H_5$, —$CH_2OH$, or —$C_2H_4OH$); $R_3$ is a $C_1$-$C_4$ alkyl group, (e.g., $CH_3$); and $R_4$ is —OH or —$OR_5$, where $R_5$ is —($CH_2$)—C($R_1R_2$)—$NHR_3$; and (each) n is an integer from 1 to 4 (e.g., from 1 to 3). In one preferred embodiment, the scrubbing solution contains an alkanolamine where $R_1$ is hydrogen and $R_4$ is —OH, but also contains substantially no (and/or no intentionally added) alkanolamines where both $R_1$ and $R_2$ are methyl, n is 1, and $R_4$ is —OH.

The $R_1$, $R_2$, $R_3$ groups of the $R_5$ moiety may be the same or different as those in the remainder of the molecule and, in the $R_5$ moiety, may be branched chain groups such as isopropyl, isobutyl, sec-butyl, or tert-butyl, although the higher degree of steric hindrance conferred by bulky groups on the carbon alpha to the amino group can be less preferred, particularly if the hindrance tends to retard the reaction rate between the amine and the $CO_2$; for this reason tertiary alkyl groups, especially bulky groups such as tert-butyl, can be less preferred for each $R_1$ and $R_2$, although there is not necessarily a prejudice against the alpha carbon itself being tertiary with relatively smaller alkyl groups as in 2-N-methylamino-2-methyl-1-propanol (MAMP). The low molecular weight alkanolamines according to the above formula (e.g., about 180 amu or less, about 150 amu or less, about 120 amu or less, or about 100 amu or less) can be particularly preferred where $R_4$ is —OH. With a limit on molecular weight of 180 amu as a factor, such alkanolamines can normally be mono-amino, mono-hydroxyl compounds.

The use of hydroxyalkyl substituents, such as hydroxymethyl, hydroxyethyl, hydroxypropyl, and/or hydroxybutyl groups on the alkanolamines/aminoethers can provide a way of controlling solubility of the reaction products, as well as the viscosity of the rich solution stream. Sterically hindered polyhydroxy derivatives of the N-alkyl secondary amines can include, but are not limited to, dihydroxylalkanolamines such as 2-aminomethyl-2-methyl-3-hydroxy-1-propanol (2-aminomethyl-2-methyl propylene-1,3-glycol); trihydroxylalkanolamines such as 2-aminomethyl-2-hydroxymethylpropylene-1,3-glycol; relatively low molecular weight ethers such as bis-(2,2-dimethyl-2-aminoethyl)ether, and the like, as well as combinations thereof.

One preferred class of sorbent comprises the N-alkyl (e.g., N-methyl) derivatives of aminopropanol such as 2-N-methylamino-1-propanol (MAP, mw≈89 amu) and/or 2-N-methylamino-2-methyl-1-propanol (MAMP, mw≈103), pictured below:

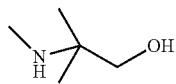

One notable feature of the present class of hindered secondary alkanolamines is that they can react with $CO_2$ to form reaction products that can remain soluble up to significantly higher concentrations than the reaction products with other types of amines, such as 2-amino-2-methyl-1-propanol (AMP).

Specific aminoethers according to the general formula and within the preferred range of molecular weights can include N-methylaminoethyl-methyl ether (mw≈89), N-methylaminoethyl-ethyl ether (mw≈103), N-ethylaminoethyl-methyl ether (mw≈103), N-ethylaminoethyl-ethyl ether (mw≈117). N-methylaminoethyl-propyl ether (mw≈117) and N-methylaminoethyl-t-butyl ether (mw≈131). The alkoxy groups on ethers of this type can promote water solubility of the $CO_2$: amine reaction products, assisting operation of the process.

It has been found that MAP offers the highest working capacity, being capable of sorbing $CO_2$ into aqueous solution at amine concentrations (prior to sorption of $CO_2$) above 3.5M and up to about 7M or about 8M. The $CO_2$ loading that can be achieved without formation of insoluble precipitates, as compared to AMP, is closer to that of methylaminoethanolamine (MAE), although the reaction mechanism is different—in aqueous solution, MAP can simultaneously form the bicarbonate and carbamate. The reaction can proceed readily in the presence of water with the rate varying according to the specific amine; MAP reacts readily in the absence of a promoter, but the reaction with MAMP proceeds more slowly as a result of the greater degree of steric hindrance on the carbon alpha to the nitrogen from the extra alkyl substituents. Thus, in some embodiments, the hindered secondary amine comprises MAP and not MAMP.

High solution loadings can be coupled with favorable vapor-liquid equilibria (VLE), indicating that regeneration to a defined residual $CO_2$ level in the lean stream may be achieved under less severe conditions than with MEA, as demonstrated herein. The lower thermal stability of the carbamate of MAP can permit a desirably low level of residual $CO_2$ to be achieved by pressure reduction or stripping alone in the regeneration zone(s).

Operation using MAP can be especially favorable in view of its relatively high reaction rates, acceptable viscosity, and relatively high water solubility of the $CO_2$ reaction products. The carbamate and bicarbonate reaction products have lower stability (although adequate for sorption) and can therefore be regenerated using a smaller temperature increase above that of the sorption zone. This lower stability can further imply that the residual $CO_2$ concentration in the lean stream returned to the sorption zone may be acceptably low. These properties can suggest a potential for desorption of $CO_2$ by indirect heating of the bicarbonate in a heat exchanger or related unit, such as a flash drum. Such a configuration can reduce the operating expense of the plant by reducing the size of (or eliminating the need for) a conventional stripper.

The vapor-liquid equilibria for the $CO_2$/MAP aqueous system appear to indicate the potential for operation with a minimum MAP concentration in aqueous solution of at least 3.0M and desirably higher, e.g. at least 3.5M, at least 4M, at least 5M, at least 6M, or at least 7M, with 8M, or conservatively 7.5M, representing a practical upper value in normal operation without incurring excessive viscosity increases in the rich amine stream or undue risk of forming insoluble precipitates from the reaction products. At temperatures up to about 65° C., at $CO_2$ partial pressures from about 0.01 bar (corresponding to ~1 wt % in approximately atmospheric pressure feed) to about 0.15 bar (corresponding to ~15 wt % in approximately atmospheric pressure feed), $CO_2$ can be taken up into the aqueous sorbent medium, potentially increasing to about 20 wt % at approximately atmospheric pressures. On heating to about 90° C., the level of $CO_2$ retention within the sorbent medium can decrease to about 2 wt % or below, affording the possibility of removing as much as about 18 wt % per pass (on each sorptive-desorptive cycle), with the rapid reaction rate permitting fast circulation between the sorption and regeneration zones, in a highly efficient, relatively high capacity process.

The $CO_2$ uptake from the gas stream appears linear with the $CO_2$ content in the gas stream at relatively low and relatively high MAP concentrations. At ~65° C., for example, the uptake should be about 0.4 mol $CO_2$/mol MAP at about 7M alkanolamine concentration with a gas stream containing about 1 vol % $CO_2$, increasing almost linearly to about 7.5 mol $CO_2$/mol MAP at about 100 vol % $CO_2$ in the feedstream. However, this operating window could potentially be improved by adding a low concentration co-sorbent, as described further below.

It is hypothesized that the hindered secondary alkanolamine 2-N-methylamino-2-methyl-1-propanol (MAMP) can react with $CO_2$ by a different mechanism than MAP, by virtue of the alkyl group on the carbon alpha to the nitrogen—MAMP appears not to form a carbamate intermediate but appears to proceed directly to the bicarbonate, which seems to remain soluble up to about 5M alkanolamines concentration. The bicarbonate product appears to have a relatively low stability, comparable to that of MAP, but the MAMP reaction rate can be slower than with MAP, meaning that the operating window with pure MAMP can be reduced somewhat.

The secondary amines can be used as the $CO_2$ capture agents without the necessity of a promoter to increase the reaction rate in most cases. Thus, in certain embodiments, the solution can consist essentially of the sterically hindered amine sorbent with solvent and additives (e.g., anti-foam additives, antioxidants, etc.). Additionally or alternately in certain circumstances, the solution can specifically comprise no intentionally added promoters, particularly no intentionally added nitrogen-containing promoters, e.g., no intentionally added heterocyclic promoters having a single nitrogen atom and at least one other heteroatom (such as morpholine, thiomorpholine, alkyl and/or hydroxyalkyl derivatives thereof, and combinations thereof); no intentionally added heterocyclic promoters having at least two nitrogen atoms (such as piperazinyl promoters including but not limited to piperazine, 2-methylpiperazine, 2,5-dimethylpiperazine, 2,3-dimethylpiperazine, 2,4-dimethylpiperazine, 1-hydroxyethylpiperazine, 2-hydroxyethylpiperazine, 1,4-dihydroxyethylpiperazine, 1,3-dihydroxyethylpiperazine, 1,2-dihydroxyethylpiperazine, 2,5-dihydroxyethylpiperazine, 2-aminoethylpiperazine, derivatives thereof including alkyl, hydroxyalkyl, and aminoalkyl derivatives, and combinations thereof); or the like, or a combination thereof. MAP can be particularly preferred from this point of view, as the reaction with $CO_2$ can proceed readily without promoters, notably without nitrogen-containing heterocyclic promoters. A heterocyclic promoter, especially of the piperazinyl type, may however be used in systems where the reaction rate is considered insufficient. Combinations of the present secondary amines may, however, be used or combinations with other amines such as those conventionally used in acid gas separation systems (e.g., MEA, DEA, TEA, etc.), and the use of an intentionally added promoter (e.g., a piperazinyl promoter) in the mixed system as described above, is not necessarily excluded, particularly if the reaction rate is found to be unacceptably slow.

Solvent

The concentration of the amine in aqueous solution may be adjusted to maintain the desired viscosity as needed, particularly for the rich solution containing the sorbed $CO_2$. Normally water can generally be adequate, but a beneficial effect may be obtained by the use of a co-solvent, especially a polar, aprotic co-solvent. The use of the present hindered secondary (low molecular weight) amines can enable the present process to be readily adapted to application in existing commercial aqueous amine scrubbing units and can therefore be preferred from this point of view. A polar co-solvent with the water, however, may enable enhanced solvation of the reaction products, as compared to water alone or water with a co-solvent of lower polarity, thus reducing/minimizing any tendency to form precipitates while still allowing formation of bicarbonates, which create fewer corrosion concerns than carbamates. A polar solvent can additionally or alternatively increase the physical sorption of $CO_2$ in solution, thereby facilitating increased loading/capacity of the sorbent. Purely non-aqueous polar solvents would be expected to be less corrosive, enabling the use of cheaper metallurgics, e.g., carbon steel, with reduced concern about corrosion, e.g., at higher loadings.

The preferred co-solvents can advantageously have a relatively high boiling point, e.g., at least 65° C., preferably 70° C. or higher, in order to enable reduced solvent losses in the process. Furthermore, higher boiling points can be desirable in some embodiments, depending on the regeneration conditions to be used. Use of higher boiling point solvents can conserve valuable energy that would otherwise be consumed in vaporization of the solvent.

These hindered amine systems can preferably be used in aqueous solution but may additionally or alternately be admixed with polar organic (co-)solvents. Suitable (co-)solvents can include, but are not limited to, lower alkanols with boiling points above 100° C.; ketones such as methyl ethyl ketone (MEK), methyl butyl ketone (MBK), methyl isobutyl ketone (MIBK), and the like; dimethylsulfoxide (DMSO): N-methylpyrrolidone (NMP); N,N-dimethylformamide (DMF): N,N-dimethylacetamide (DMAc); sulfolane (tetramethylene sulfone); hexamethylphosphoramide (HMPA); tetrahydrofuran (THF); acetonitrile; propylene carbonate; dimethyl ethers of ethylene and/or propylene glycols; esters such as ethyl acetate and/or amyl acetate; halocarbons such as 1,2-dichlororobenzene (ODCB); and combinations thereof.

Once the liquid sorbent medium has been formulated with the alkanolamine or aminoether and the (co-)solvent/medium, optionally with ingredients such as antioxidants, corrosion inhibitors, and the like, it can be employed, for example, in a liquid process cyclic sorption unit, as described above.

The concentration of the amine can vary over a wide range, e.g. from about 1M to about 8M, although higher concentrations (e.g., up to about 9M or about 10M) are not necessarily excluded, if solid precipitation does not become economically unmanageable. If a solid precipitate does occur from the reaction product of the $CO_2$ and amine, the plant can be modified to remove the solids from the rich amine solution before the rich solution enters the regeneration zone. Separation of solid precipitates and any other solids that may enter the system, e.g., insoluble degradation products, can be effected by using a hydrocyclone, centrifuge, strainer, filter belt, or other suitable solids separator. Such liquids/solids separation technologies are well known. Since the sorption temperature and pKa of the amine can be important parameters that determine the reaction equilibria and the reaction rates, an acceptable (and/or the optimal) concentration of the amine for operation may be determined empirically taking this into account, along with sorbent viscosity and perhaps other factors. In general, the total amine/base concentration in the solvent/medium can preferably be from about 3M to about 8M with values above about 3.5M or above about 4M being preferred to achieve high cyclic (swing) capacity.

ADDITIONAL EMBODIMENTS

Additionally or alternatively, the present invention can include one or more of the following embodiments.

Embodiment 1

A high cyclic capacity carbon dioxide scrubbing process which comprises: (i) contacting a gas stream containing carbon dioxide in a sorption zone with an aqueous liquid scrubbing solution of a sterically hindered secondary amine at a total secondary amine concentration of at least 3.5M (e.g., at least about 4.0M, at least about 5.0M, or from 5.0M to about 7.0M) of the secondary amine and at a temperature of at least 10° C. (e.g., at least about 30° C. at least about 40° C., from about 30° C. to about 60° C., or from about 60° C. to about 90° C.) to sorb the carbon dioxide into the amine solution and form a rich stream of the sorbed carbon dioxide in the amine solution in the form of amine carbamate and/or amine bicarbonate dissolved in the solution; (ii) passing the rich stream from the sorption zone to at least one regeneration zone and desorbing the sorbed carbon dioxide as gas from the amine solution (e.g. in at least one regeneration zone at a temperature higher than the temperature of the sorption zone, such as at a temperature from 65° C. to 120° C. or from 65° C. to 100° C.) to form a lean solution containing a reduced concentration of sorbed carbon dioxide relative to the rich stream; and (iii) returning the lean stream to the sorption zone.

Embodiment 2

A high cyclic capacity carbon dioxide scrubbing process which comprises: (i) contacting a flue gas from a hydrocarbon combustion process containing carbon dioxide in a sorption zone with an aqueous liquid alkanolamine scrubbing solution of 2-N-methylamino-1-propanol at a total concentration of at least 4.0M of the alkanolamine(s) and at a temperature of at least 30° C. and a partial carbon dioxide pressure of at least 0.025 bar to sorb the carbon dioxide from the flue gas into the amine solution and form a rich stream of the sorbed carbon dioxide in the amine solution in the form of alkanolamine carbamate and/or alkanolamine bicarbonate dissolved in the amine; (ii) passing the rich amine stream from the sorption zone to a regeneration zone and desorbing the sorbed carbon dioxide as gas from the alkanolamine solution to form a lean solution containing a reduced concentration of sorbed carbon dioxide relative to the rich stream and regenerated 2-N-methylamino-1-propanol; and (iii) returning the lean stream to the sorption zone.

Embodiment 3

The process according to embodiment 1 or embodiment 2, wherein one or more of the following is satisfied: the carbon dioxide loading in the rich stream is at least 0.3 mol $CO_2$ per mol of secondary amine, e.g. at least 0.4 mol $CO_2$ per mol of secondary amine; the carbon dioxide is contacted with the amine solution in the sorption zone at a carbon dioxide partial pressure of at least 0.025 bar; and the viscosity of the rich stream is preferably not more than about 10 cPs.

Embodiment 4

The process according to any one of the previous embodiments, wherein one or more of the following are satisfied: the carbon atom alpha to the nitrogen atom of the sterically hindered secondary amine is a secondary carbon having one proton; the carbon atom alpha to the nitrogen atom of the sterically hindered secondary amine is a tertiary carbon having two $C_1$-$C_2$ alkyl (e.g., methyl) substituents; the secondary amine comprises an alkanolamine (e.g., in which the carbon atom alpha to the nitrogen atom is a secondary carbon having one proton, such as 2-N-methylamino-1-propanol); the aqueous liquid scrubbing solution comprises no intentionally added promoter; and the aqueous liquid scrubbing solution consists essentially of an aqueous solution of an alkanolamine (e.g., 2-N-methylamino-1-propanol).

Embodiment 5

The process according to any one of the previous embodiments, wherein the sterically hindered secondary amine comprises: an aminoether having a molecular weight of not more than 180; a sterically hindered aminoether in which the carbon atom alpha to the nitrogen atom is a secondary carbon having one proton; N-methylaminoethyl-methyl ether, N-methylaminoethyl-ethyl ether, N-ethylaminoethyl-methyl ether, N-ethylaminoethyl-ethyl ether. N-methylaminoethyl-propyl ether, N-methylaminoethyl-tert-butyl ether, or a combination thereof; or a combination thereof.

Embodiment 6

The process according to any one of the previous embodiments, the gas stream containing carbon dioxide comprises flue gas from a hydrocarbon combustion process.

Embodiment 7

The process according to any one of the previous embodiments, wherein the sorbed carbon dioxide is desorbed from the rich stream in at least one regeneration zone at a temperature higher than the temperature of the sorption zone either below 100° C. (e.g. from 65° C. to 100° C. or from 90° C. to 100° C.) or from 100° C. to 120° C.

Embodiment 8

The process according to any one of the previous embodiments, wherein the sorbed carbon dioxide is desorbed from the rich stream (e.g., by stripping the rich stream with a gas such as $CO_2$) in at least one regeneration zone, and/or the desorbed $CO_2$ is recycled to the regeneration zone to strip the rich stream.

Embodiment 9

The process according to any one of the previous embodiments, wherein the aqueous liquid scrubbing solution comprises at least one alkanolamine having the general formula $R_3HN$—$C(R_1R_2)$—$(CH_2)_n$—$R_4$, where $R_1$ is hydrogen or a $C_1$-$C_4$ alkyl or hydroxyalkyl group (e.g., —$CH_3$, —$C_2H_5$, —$CH_2OH$, or —$C_2H_4OH$); $R_2$ is a $C_1$-$C_4$ alkyl or hydroxyalkyl group, (e.g., —$CH_3$, —$C_2H_5$, —$CH_2OH$, or —$C_2H_4OH$); $R_3$ is a $C_1$-$C_4$ alkyl group, (e.g., $CH_3$); and $R_4$ is —OH or —$ORS$, where $R_5$ is —$(CH_2)$, —$C(R_1R_2)$—$NHR_3$; and (each) n is an integer from 1 to 4 (e.g., from 1-3), but substantially no (and/or no intentionally added) alkanolamines where both $R_1$ and $R_2$ are methyl, n is 1, and $R_4$ is —OH, and/or wherein the aqueous liquid scrubbing solution consists essentially of an aqueous solution of 2-N-methylamino-1-propanol.

Embodiment 10

The process according to any one of the previous embodiments, wherein the desorbing in step (ii) is accomplished by (a) sending the rich amine solution to a first regeneration zone flash drum, where carbon dioxide is desorbed from the rich amine solution to form a first intermediate desorbed solution; (b) sending the first intermediate desorbed solution to a stripping zone in which it is contacted, directly or indirectly, with a stripping medium to desorb further carbon dioxide from the first intermediate desorbed solution, thus forming a second intermediate desorbed solution; and (c) optionally sending the second intermediate desorbed solution to a second regeneration flash drum, where still further carbon dioxide is desorbed from the second intermediate desorbed solution, thus forming a third intermediate desorbed solution, wherein the second intermediate desorbed solution and/or the optional third intermediate desorbed solution is/are returned to the sorption zone as the lean stream in step (iii).

EXAMPLES

Example 1

The mechanism of the reaction of $CO_2$ with 2-N-methylamino-propanol (MAP) was evaluated using in-situ NMR techniques by bubbling $CO_2$-containing gas through a ~3M aqueous solution of MAP at a fixed temperature (~30° C.) and flow rate (~10 sccm) and detecting $CO_2$-amine reaction products with $^{13}C$ NMR as a function of reaction time. FIG. 1 qualitatively illustrates that $CO_2$ preferentially forms carbonate-bicarbonate species with MAP ($^{13}C$ NMR peak shifting from ~166.0 to ~160.0 ppm) while carbamate species ($^{13}C$ NMR peak at 164.5 ppm) exist at low concentration. Low concentration of carbamate species and high concentration of bicarbonate species at equilibrium is explained by the steric hindrance of amino group of MAP, which decreases the amine affinity to the carbon of $CO_2$ and makes the N—C bond of MAP-carbamate less stable.

Example 2

Figure 2:
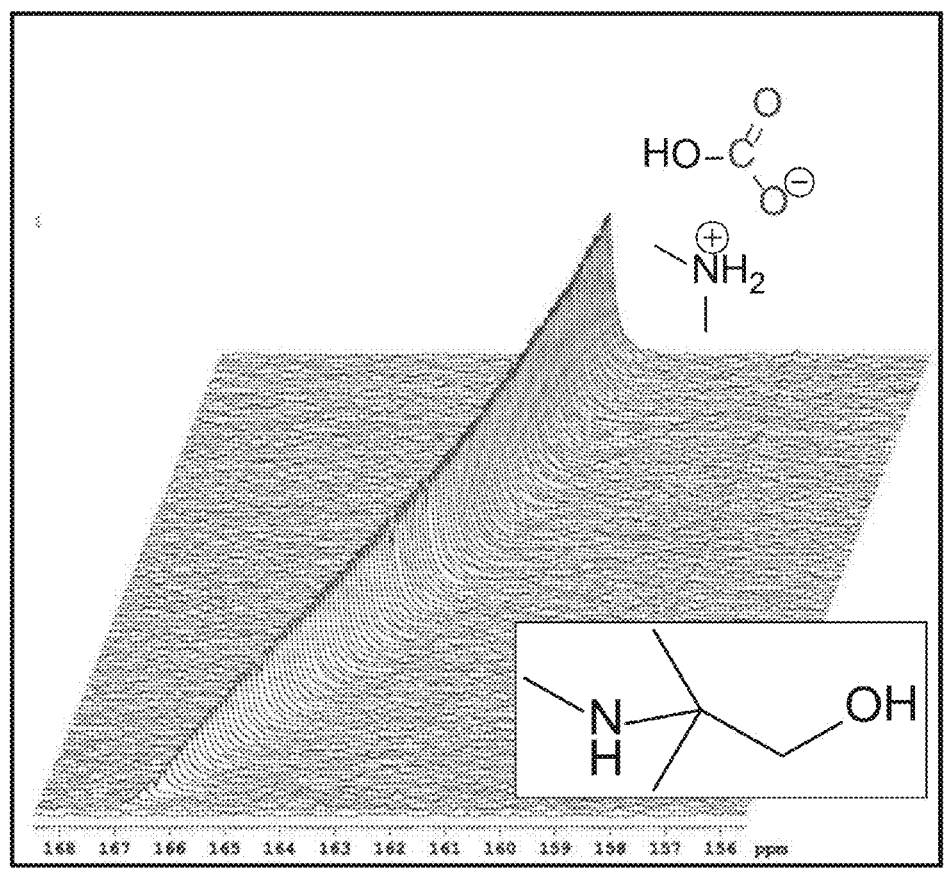

The mechanism of the reaction of $CO_2$ with N-methylamino-2-methyl-propanol (MAMP) was evaluated using in-situ NMR techniques by bubbling $CO_2$-containing gas through a ~3M aqueous solution of MAMP at a fixed temperature (~30° C.) and flow rate (~10 sccm) and detecting $CO_2$-amine reaction products with $^{13}C$ NMR as a function of reaction time. FIG. 2 qualitatively illustrates that $CO_2$ preferentially forms carbonate-bicarbonate species with MAMP ($^{13}C$ NMR peak shifting from ~168.0 to ~160.0 ppm) while carbamate species are eliminated (no $^{13}C$ NMR peak at ~165-164 ppm). Absence of carbamate species and high concentration of bicarbonate species at equilibrium is explained by the severe steric hindrance of amino groups of MAMP, which prevents a formation of N—C bond of carbamate.

Example 3

Figure 3:
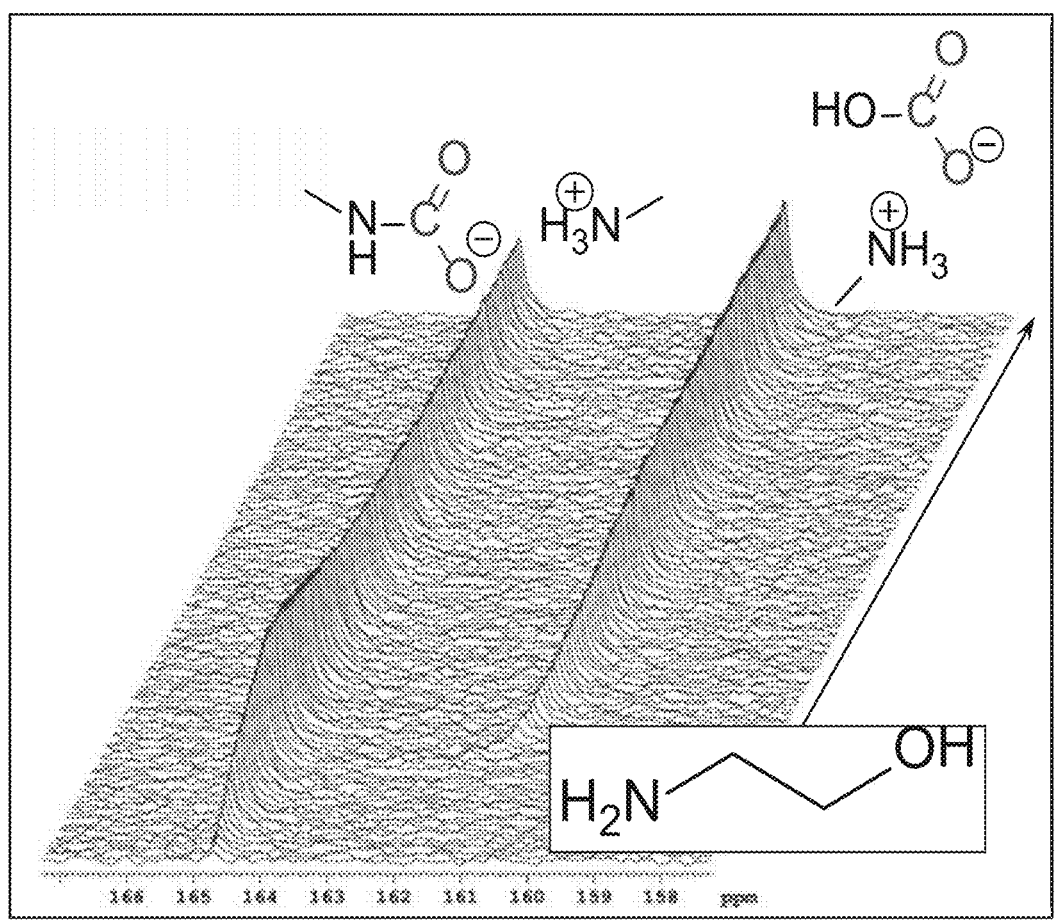

The mechanism of the reaction of $CO_2$ with monoethanolamine (MEA) was evaluated using in-situ NMR techniques by bubbling $CO_2$-containing gas through a ~3M aqueous solution of MEA at a fixed temperature (~30° C.) and flow rate (~10 sccm) and detecting $CO_2$-amine reaction products with $^{13}C$ NMR as a function of reaction time. FIG. 3 qualitatively illustrates that a significant fraction of MEA molecules form carbamate species with $CO_2$ ($^{13}C$ NMR peak at ~164.5 ppm) while bicarbonate species ($^{13}C$ NMR peak at ~160.0 ppm) also exist. Higher concentration of carbamate species relative to MAP and MAMP is explained by the absence of steric hindrance of amino group of MEA and, as a result, high affinity of MEA amine to the carbon of $CO_2$. It is worth noting that the high affinity of MEA amine to $CO_2$ makes the N—C bond of MEA-carbamate stable which requires high temperature (e.g., energy) for amine regeneration.

Example 4

The vapor-liquid equilibria of 2-N-methylamino-1-propanol (MAP) were determined by bubbling $CO_2$ through aqueous solutions ~3M, ~5M, and ~7M MAP, equivalent to solution loadings of ~27.1, ~45.7, and ~64.7 wt % in water at $CO_2$ partial pressures of ~0.01, ~0.1 and ~1 bar and at temperatures of ~45, ~65, and ~90° C. Table 2 includes data up to ~10 bar. Note that, by ~10 bar at ~45° C., capacity appears to have leveled out near maximum.

The results are shown in Tables 1-3 below.

TABLE 1

$CO_2$ Sorption in ~3M MAP

| | | Rich Solution | | | |
|---|---|---|---|---|---|
| T, ° C. | P(CO2), bar* | Mol $CO_2$ per mol of amine | Carbamate per amine | Bicarbonate per amine | Bicarbonate/carbamate mol ratio |
| 45 | 0.01 | 0.417 | 0.167 | 0.25 | 1.50 |
| 45 | 0.1 | 0.694 | 0.218 | 0.476 | 2.18 |
| 45 | 1 | 0.936 | 0.01 | 0.926 | 92.6 |
| 45 | 10.0 | 1.04 | 0.00 | 1.04 | >100 |
| 65 | 0.01 | 0.312 | 0.138 | 0.174 | 1.26 |
| 65 | 0.1 | 0.5675 | 0.1875 | 0.38 | 2.03 |
| 65 | 1 | 0.8 | 0.092 | 0.708 | 7.70 |
| 90 | 0.01 | 0 | 0 | 0 | — |
| 90 | 0.1 | 0.172 | 0.095 | 0.077 | 0.81 |
| 90 | 1 | 0.436 | 0.275 | 0.161 | 0.59 |

*1%, 10% and 100% $CO_2$ in the gas, with the remainder being inert ($N_2$).

TABLE 2

$CO_2$ Sorption in ~5M MAP

| | | Rich Solution | | | |
|---|---|---|---|---|---|
| T, ° C. | P(CO2), bar | Mol $CO_2$ per mol of amine | Carbamate per amine | Bicarbonate per amine | Bicarbonate/carbamate mol ratio |
| 45 | 0.01 | 0.26 | 0.15 | 0.11 | 0.70 |
| 45 | 0.1 | 0.58 | 0.33 | 0.25 | 0.74 |
| 45 | 1 | 0.92 | 0.15 | 0.77 | 5.22 |
| 45 | 10.0 | 1.01 | 0.03 | 0.95 | 31.6 |
| 65 | 0.01 | 0.25 | 0.13 | 0.12 | 0.91 |
| 65 | 0.1 | 0.47 | 0.24 | 0.23 | 0.99 |
| 65 | 1 | 0.77 | 0.23 | 0.54 | 2.35 |
| 90 | 0.01 | 0 | 0 | 0 | |
| 90 | 0.1 | 0.085 | 0.085 | 0 | 0.00 |
| 90 | 1 | 0.4 | 0.26 | 0.14 | 0.54 |
| 120 | 0.1 | 0 | 0 | 0 | |
| 120 | 0.5 | 0.068 | 0.068 | 0 | 0.00 |
| 120 | 1 | 0.11 | 0.11 | 0 | 0.00 |
| 120 | 2.0 | 0.3 | — | — | — |
| 120 | 10.0 | 0.61 | — | — | — |

TABLE 3

$CO_2$ Sorption in ~7M MAP

| | | Rich Solution | | | |
|---|---|---|---|---|---|
| T, ° C. | P(CO2), bar | Mol $CO_2$ per mol of amine | Carbamate per amine | Bicarbonate per amine | Bicarbonate/carbamate mol ratio |
| 45 | 0.01 | 0.41 | 0.25 | 0.16 | 0.64 |
| 45 | 0.1 | 0.56 | 0.44 | 0.12 | 0.28 |
| 45 | 1 | 0.71 | 0.23 | 0.48 | 2.04 |
| 65 | 0.01 | 0.28 | 0.16 | 0.12 | 0.79 |
| 65 | 0.1 | 0.42 | 0.24 | 0.18 | 0.74 |
| 65 | 1 | 0.71 | 0.28 | 0.43 | 1.57 |
| 90 | 0.01 | 0 | 0 | 0 | |
| 90 | 0.1 | 0.067 | 0.067 | 0 | 0.00 |
| 90 | 1 | 0.27 | 0.27 | 0 | 0.00 |
| 120 | 0.1 | 0 | 0 | 0 | |
| 120 | 0.5 | 0.043 | 0.043 | 0 | 0.00 |
| 120 | 1 | 0.08 | 0.08 | 0 | 0.00 |

TABLE 4

CO$_2$ Sorption in ~5M MEA

| T, °C. | P(CO2), bar | Mol CO$_2$ per mol of amine | Rich Solution Carbamate per amine | Bicarbonate per amine | Bicarbonate/ carbamate mol ratio |
|---|---|---|---|---|---|
| 45  | 1  | 0.6  | 0.38 | 0.21 | 0.55 |
| 45  | 2  | 0.65 | 0.34 | 0.3  | 0.88 |
| 45  | 10 | 0.75 | 0.24 | 0.49 | 2.04 |
| 120 | 2  | 0.44 | —    | —    | —    |
| 120 | 10 | 0.57 | —    | —    | —    |

Figure 4:
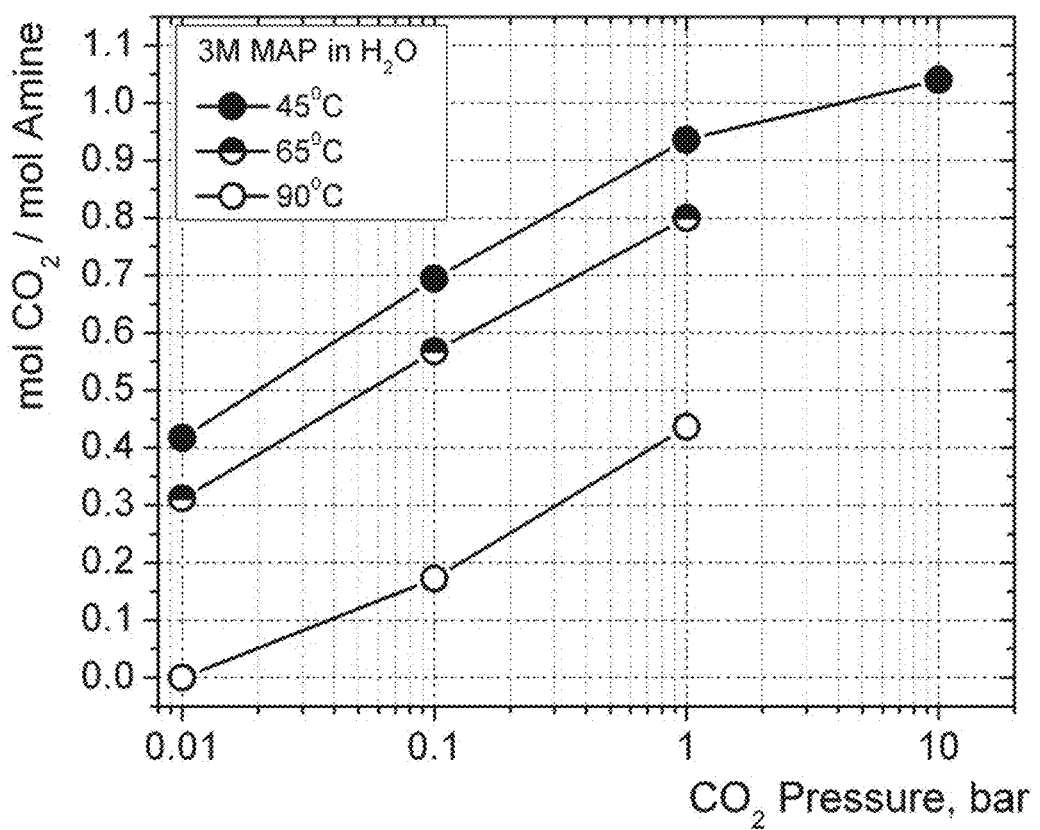
FIGS. 4-6 are graphs showing the vapor-liquid equilibria for the $CO_2$/MAP system at various molar concentrations of MAP in water at different temperatures and pressures.
Figure 5:
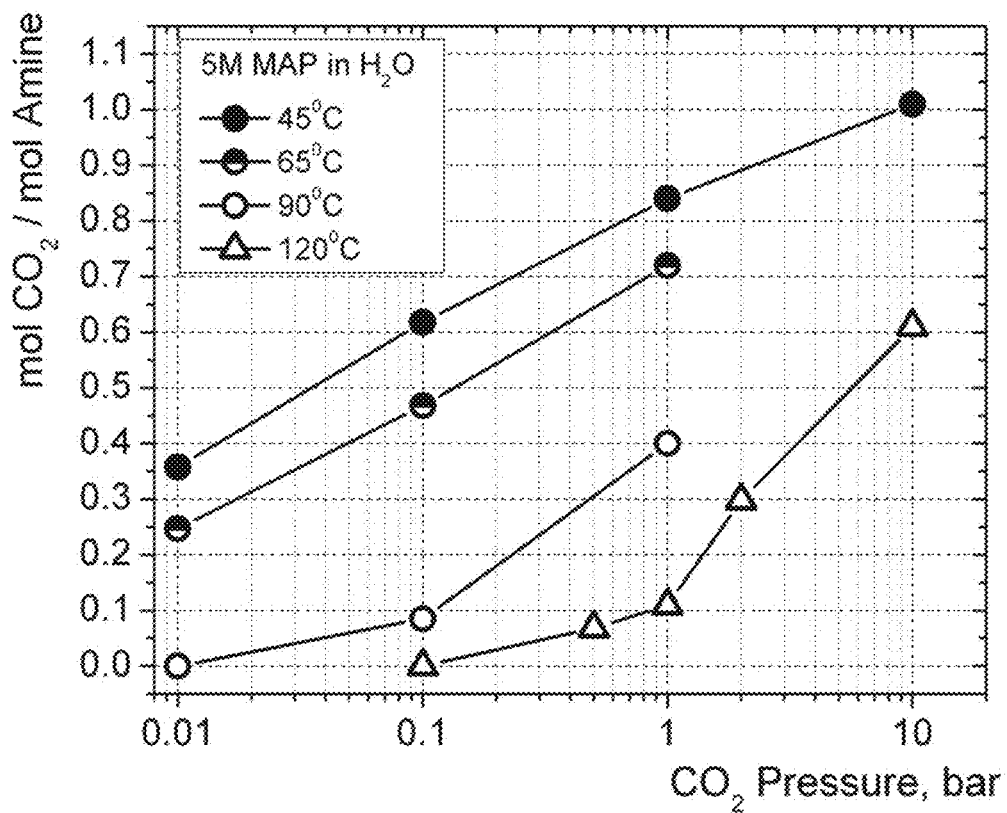
Figure 6:
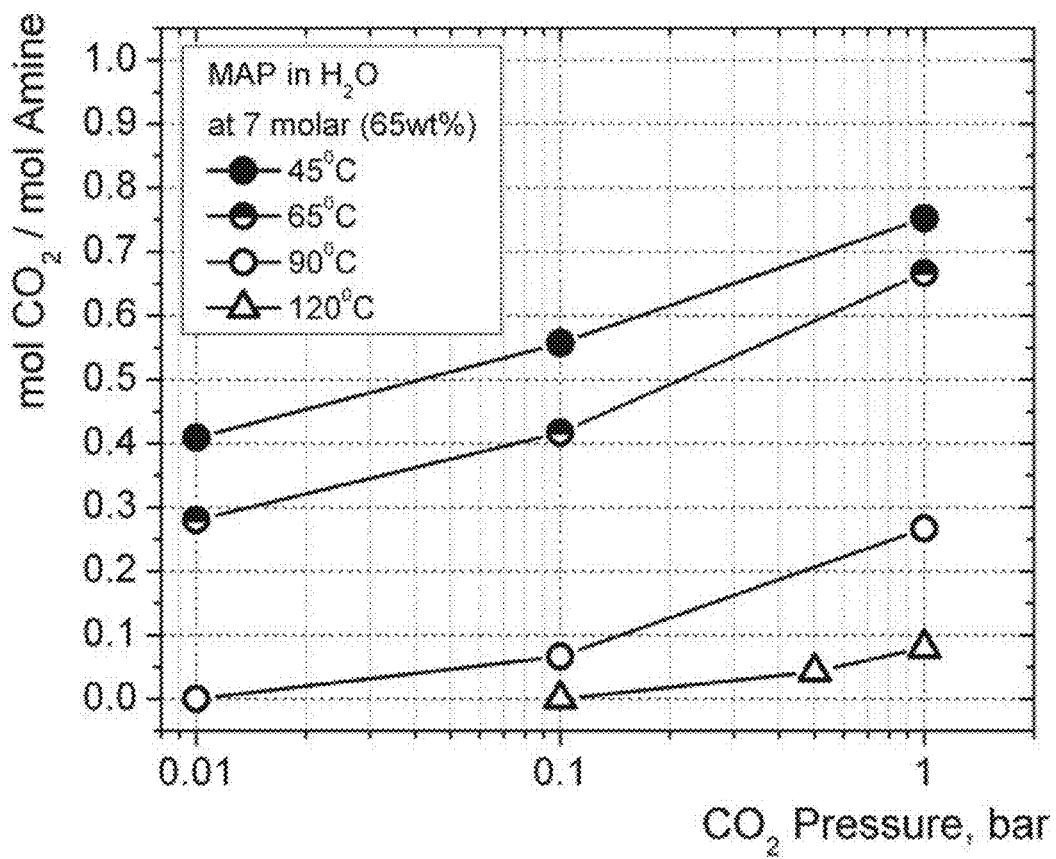

The results, which are shown graphically in FIGS. 4-5, indicate that MAP can be used very effectively to sorb $CO_2$. At ~3M amine concentration and ~0.1 bar $CO_2$ partial pressure, the difference in chemisorbed $CO_2$ loading appeared to be ~0.5 mol $CO_2$/mol amine when the temperature is raised from ~45° C. to ~90° C., which was a very similar result as at $CO_2$ partial pressure of ~1 bar (FIG. 4). With a higher amine concentration of ~5M, the net differences at the same temperatures were ~0.6 and ~0.5 (FIG. 5). At ~7M concentration (FIG. 6), the differences at ~45 and ~90° C. appeared similar, with a widening on increasing the temperature to ~120° C.

Example 5

Figure 7:
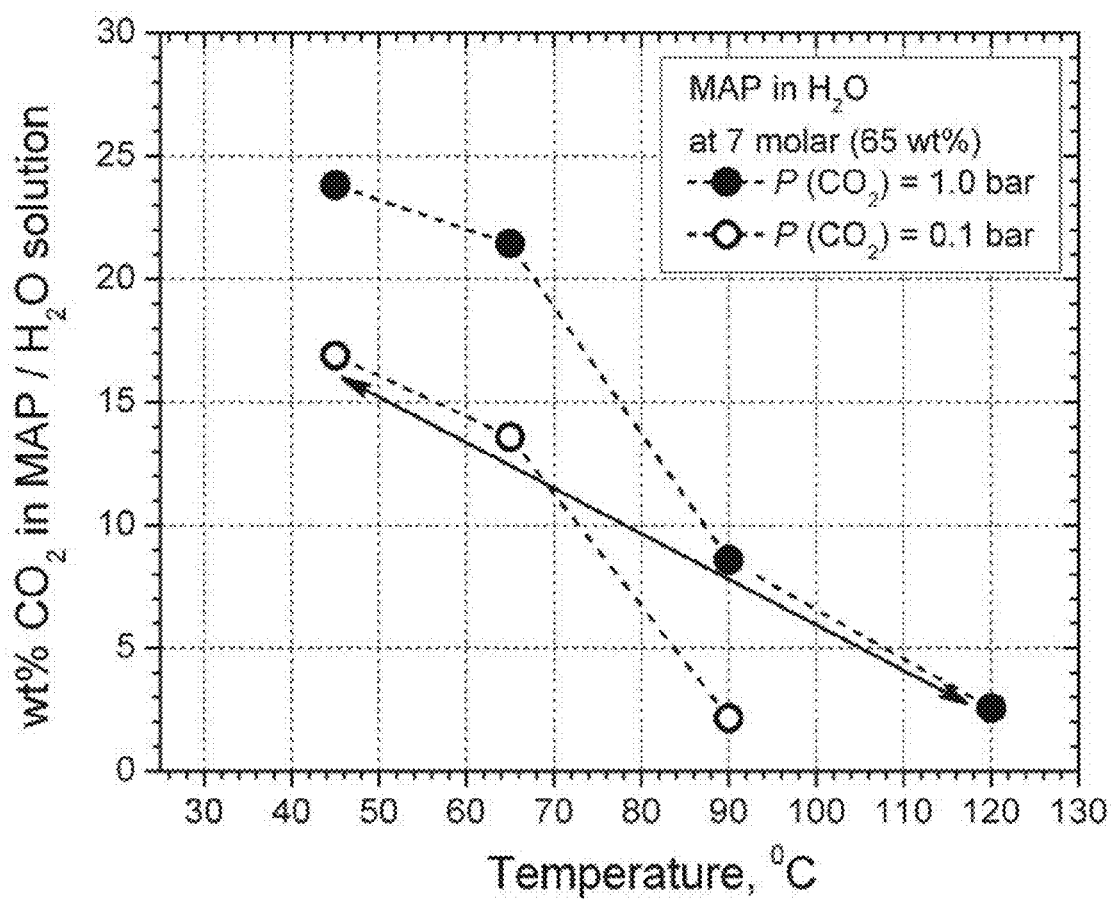
FIGS. 7-8 compare the working capacity for MAP and MEA at different temperatures.
Figure 8:
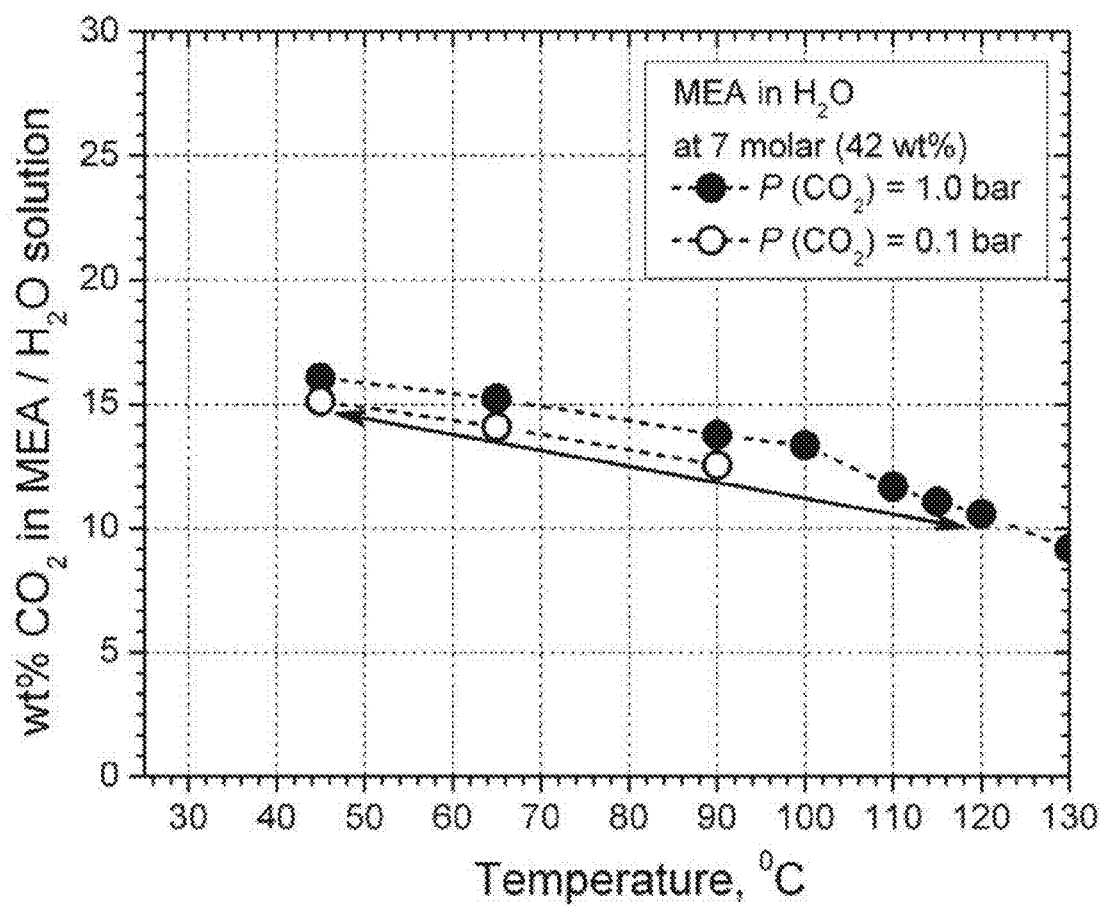

The increased working capacity for MAP, in comparison with MEA, can be represented by the amounts of $CO_2$ sorbed into the solution at different temperatures; this can be seen more clearly in FIGS. 7 and 8. FIG. 7 shows a significant difference in the $CO_2$ take-up at different temperatures, ~45 to ~90° C., indicating the potential for regeneration at temperatures below 100° C., and advantageously removing the need for evaporating the water in the solution with a consequent reduction in the energy consumption. In contrast, for MEA (FIG. 7), only a small window was observed between the sorption and regeneration temperatures, emphasizing the desirability of MAP.

Example 6

The temperature dependence of $CO_2$ solubility in aqueous MAP at relatively high MAP concentrations (~7M) is shown in Table 4 below.

TABLE 4

Temperature Dependence of CO$_2$ Solubility in Aqueous MAP

| Temp., °C. | CO$_2$ partial pressure, bar | Mol CO$_2$/mol of MAP |
|---|---|---|
| 45  | 0.13 | 0.53  |
| 65  | 0.13 | 0.39  |
| 90  | 0.13 | 0.096 |
| 45  | 0.13 | 0.51  |
| 45  | 1.3  | 0.63  |
| 65  | 1.3  | 0.60  |
| 90  | 1.3  | 0.38  |
| 120 | 1.4  | 0.008 |

Example 7

Figure 9:
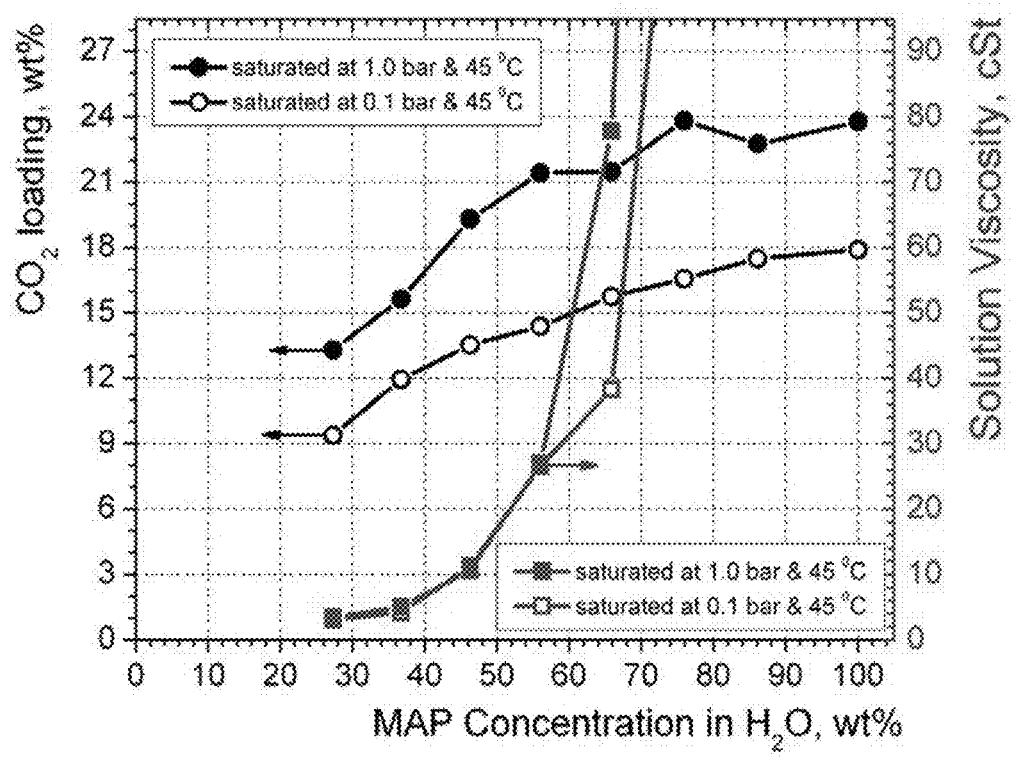
FIG. 9 illustrates $CO_2$ loading and viscosity of $CO_2$-loaded MAP solutions as a function of MAP concentration in water.

The viscosity of $CO_2$ loaded aqueous solutions of 2-N-methylamino-propanol (MAP) was studied as a function of MAP concentration in water and $CO_2$ partial pressure. Two series containing eight MAP solutions (from ~26 wt % to ~100 wt %) were heated to ~45° C. and saturated with $CO_2$ at partial pressures of ~0.1 bar and ~1.0 bar, respectively. $CO_2$ loading and viscosity of solutions were analyzed using $^{13}C$ NMR spectroscopy and a commercial bench top viscometer Cannon SimpleVis at ~40° C. FIG. 9 shows that $CO_2$ loading in the amine solution (circles) appears to increase with amine concentration, reaching ~18 wt % for pure MAP saturated at ~0.1 bar of $CO_2$ and ~24 wt % for pure MAP saturated at ~1.0 bar of $CO_2$. FIG. 9 also shows that viscosity of $CO_2$-saturated solutions (squares) appears to increase as a function of MAP concentration. The acceptable concentration range for $CO_2$ capture process can be selected using FIG. 9. It is worth noting that solution viscosity appears to dramatically increase at amine concentrations above ~55 wt % (~6M), which is believed to be due to a high concentration of carbamate species in the solution.

Example 8

Figure 10:
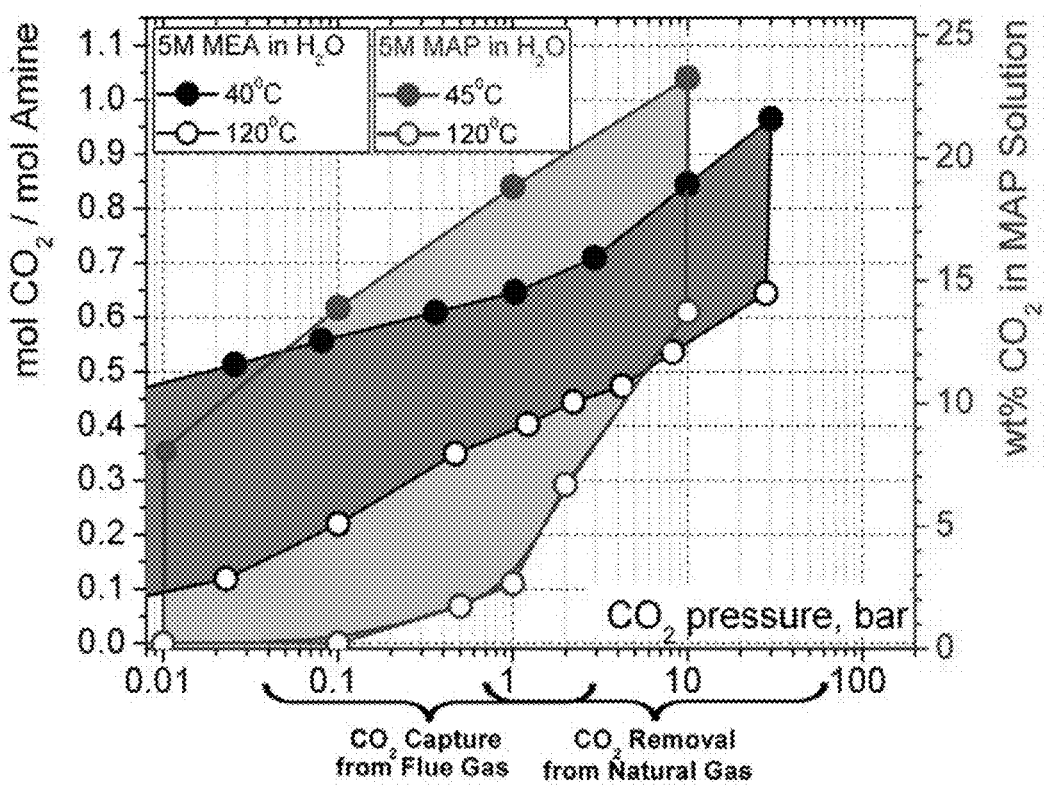
FIG. 10 compares the working capacity for ~5M MAP and ~5M MEA at different partial pressures of $CO_2$ at an absorber temperature of about 45° C. and at a regenerator temperature of about 120° C.

The increased working capacity for MAP, in comparison with MEA, can be represented by the amounts of $CO_2$ absorbed into the solution at different partial pressure of $CO_2$; this can be seen more clearly in FIG. 10. FIG. 10 shows that at $CO_2$ pressures above ~0.05 bar, ~5M MAP at ~45° C. appear to exhibit a significantly higher $CO_2$ uptake capacity relative to ~5M MEA at similar conditions. MAP also appears to show a better potential for regeneration at ~120° C. over the pressure range below ~4.0 bar of $CO_2$, suggesting a higher working capacity of MAP. In contrast to MEA, MAP does not necessarily require a direct steam injection to provide a pressure drop, in which case the need for evaporating the water in the solution can be advantageously removed, with a consequent reduction in the energy consumption. The regeneration of MAP can be performed at relatively high $CO_2$ pressures (~1.0 to ~2.0 bar), saving compression costs. FIG. 10 also appears to show MAP having an advantage over MEA in removing $CO_2$ from various sources such as flue gas (~0.05-2.5 bar of $CO_2$), natural gas (~0.5-70 bar of $CO_2$) and various units in the refinery including, but not limited to, hydrogen plants.

Although the present invention has been described in terms of specific embodiments, it need not necessarily be so limited. Suitable alterations/modifications for operation under specific conditions should be apparent to those skilled in the art. It is therefore intended that the following claims be interpreted as covering all such alterations/modifications as fall within the true spirit/scope of the invention.

What is claimed is:

1. A high cyclic capacity carbon dioxide scrubbing process which comprises:
   (i) contacting a gas stream containing carbon dioxide in a sorption zone with an aqueous liquid scrubbing solution of a sterically hindered secondary amine at a total secondary amine concentration of at least 3.5M and at a temperature of at least 10° C. to sorb the carbon dioxide into the amine solution and form a rich stream of the sorbed carbon dioxide in the amine solution in the firm of amine carbamate and/or amine bicarbonate dissolved in the solution; wherein the sterically hindered secondary amine comprises a sterically hindered aminoether in which the carbon atom alpha to the nitrogen atom is a secondary carbon having one proton having a molecular weight of not more than 180;
   (ii) passing the rich stream from the sorption zone to at least one regeneration zone and desorbing the sorbed carbon dioxide as gas from the amine solution to form a lean solution containing a reduced concentration of sorbed carbon dioxide relative to the rich stream; and (iii) returning the lean stream to the sorption zone.

2. The process according to claim 1, wherein the total secondary amine concentration of the secondary amine in the amine solution is at least 4.0M.

3. The process according to claim 1, wherein the total secondary amine concentration of the secondary amine in the amine solution is at least 5.0M.

4. The process according to claim 1, wherein the total secondary amine concentration of the secondary amine in the amine solution is from 5.0M to about 7.0M.

5. The process according to claim 1, wherein the carbon dioxide is contacted with the amine solution in the sorption zone at a temperature of at least 40° C.

6. The process according to claim 1, wherein the carbon dioxide loading in the rich stream is at least 0.4 mol $CO_2$ per mol of secondary amine.

7. The process according to claim 1, wherein the carbon dioxide is contacted with the amine solution in the sorption zone at a temperature of at least 30° C.

8. The process according to claim 7, wherein the carbon dioxide is contacted with the amine solution in the sorption zone at a temperature from 30° C. to 60° C.

9. The process according to claim 1, wherein the carbon dioxide is contacted with the amine solution in the sorption zone at a temperature from 60° C. to 90° C.

10. The process according to claim 1, wherein the carbon dioxide loading in the rich stream is at least 0.3 mol $CO_2$ per mol of secondary amine.

11. The process according to claim 1, wherein the carbon dioxide is contacted with the amine solution in the sorption zone at a carbon dioxide partial pressure of at least 0.025 bar.

12. The process according to claim 1, wherein the viscosity of the rich stream is not more than about 10 cPs.

13. The process according to claim 1, wherein a molar ratio of bicarbonate to carbamate in the rich stream is at least 1.0.

14. The process according to claim 1, wherein the sorbed carbon dioxide is desorbed from the rich stream in at least one regeneration zone at a temperature higher than the temperature of the sorption zone.

15. The process according to claim 14, wherein the sorbed carbon dioxide is desorbed from the rich amine stream in a regeneration zone(s) at a temperature from 65° C. to 120° C.

16. The process according to claim 1, wherein the carbon atom alpha to the nitrogen atom of the sterically hindered secondary amine is a secondary carbon having one proton.

17. The process according to claim 1, wherein the carbon atom alpha to the nitrogen atom of the sterically hindered secondary amine is a tertiary carbon having two $C_1$-$C_2$ alkyl substituents.

18. The process according to claim 1, wherein the carbon atom alpha to the nitrogen atom of the sterically hindered secondary amine is a tertiary carbon having two methyl substituents.

19. The process according to claim 1, wherein the secondary amine comprises an alkanolamine.

20. The process according to claim 19, wherein the secondary amine comprises a sterically hindered alkanolamine in which the carbon atom alpha to the nitrogen atom is a secondary carbon having one proton.

21. The process according to claim 20, wherein the secondary alkanolamine comprises 2-N-methylamino-1-propanol.

22. The process according to claim 21, wherein the aqueous liquid alkanolamine scrubbing solution consists essentially of an aqueous solution of 2-N-methy amino-1-propanol.

23. The process according to claim 19, wherein the secondary amine comprises at least one alkanolamine having the general formula $R_3HN-C(R_1R_2)-(CH_2)_n-R_4$, where $R_1$ is hydrogen or a $C_1$-$C_4$ alkyl or hydroxyalkyl group; $R_2$ is a $C_1$-$C_4$ alkyl or hydroxyalkyl group; $R_3$ is a $C_1$-$C_4$ alkyl group; and $R_4$ is $-OH$ or $-OR_5$, where $R_5$ is $-CH_2-C(R_1R_2)-NHR_3$; and n is an integer from 1 to 4 (e.g., from 1-3), but substantially no alkanolamines where both $R_1$ and $R_2$ are methyl, n is 1, and $R_4$ is $-OH$.

24. The process according to claim 23, wherein the secondary amine comprises 2-N-methylamino-1-propanol but substantially no 2-N-methylamino-2-methyl-1-propanol.

25. The process according to claim 1, wherein the aminoether comprises N-methylaminoethyl-methyl ether, N-methylaminoethyl-ethyl ether, N-ethylaminoethyl-methyl ether, N-ethylaminoethyl-ethyl ether, N-methylaminoethyl-propyl ether, N-methylaminoethyl-tert-butyl ether, or a combination thereof.

26. The process according to claim 1, wherein the sorbed carbon dioxide is desorbed from the rich stream in at least one regeneration zone at a temperature higher than the temperature of the sorption zone; wherein the regeneration zone is at a temperature from 65° C. to 100° C.

27. The process according to claim 1, wherein the gas stream containing carbon dioxide comprises flue gas from a hydrocarbon combustion process and/or natural gas.

28. The process according to claim 1, wherein the desorbing in step (ii) is accomplished by (a) sending the rich amine solution to a first regeneration zone flash drum, where carbon dioxide is desorbed from the rich amine solution to form a first intermediate desorbed solution;

(b) sending the first intermediate desorbed solution to a stripping zone in which it is contacted, directly or indirectly, with a stripping medium to desorb further carbon dioxide from the first intermediate desorbed solution, thus forming a second intermediate desorbed solution; and (c) optionally sending the second intermediate desorbed solution to a second regeneration flash drum, where still further carbon dioxide is desorbed from the second intermediate desorbed solution, thus forming a third intermediate desorbed solution, wherein the second intermediate desorbed solution and/or the optional third intermediate desorbed solution is/are returned to the sorption zone as the lean stream in step (iii).

* * * * *